United States Patent [19]

Kitto et al.

[11] Patent Number: 5,252,401
[45] Date of Patent: Oct. 12, 1993

[54] BONDING OF PERFLUOROELASTOMERS

[75] Inventors: David P. Kitto, Newark; Leo Ojakaar, Hockessin, both of Del.

[73] Assignee: E. I. du Pont de Nemours and Company, Wilmington, Del.

[21] Appl. No.: 895,076

[22] Filed: Jun. 8, 1992

[51] Int. Cl.$^5$ ............................................. B32B 27/00
[52] U.S. Cl. ................................... 428/422; 156/218; 156/311; 156/333
[58] Field of Search .................... 156/333, 311, 218; 428/422

[56] References Cited

U.S. PATENT DOCUMENTS

| 3,484,503 | 12/1969 | Magner et al. | 260/900 |
| 3,660,224 | 5/1972 | Cau et al. | 156/311 |
| 3,946,136 | 3/1976 | Fitz et al. | 428/422 |
| 4,713,418 | 12/1987 | Logothetis et al. | 525/200 |
| 5,051,479 | 9/1991 | Logothetis et al. | 525/197 |

Primary Examiner—John J. Gallagher

[57] ABSTRACT

Cured perfluoroelastomer, including rod stock, can be spliced using perfluoropolymer bonding agents in conjunction with moderate pressure and concentrated heat.

7 Claims, No Drawings

BONDING OF PERFLUOROELASTOMERS

BACKGROUND OF THE INVENTION

The known resistance of perfluoroelastomers to high temperatures and aggressive chemicals makes these materials particularly suitable for demanding environments such as aircraft engines and oil drilling equipment. Because of the exceptional stability of perfluoroelastomers in their cured state, fabricated articles are typically formed from the polymers in their uncured state, and then subsequently cured. For example, in the fabrication of O-rings, the perfluorinated copolymer, as appropriately compounded, is formed into a ring of the required dimensions and subsequently cured and post-cured.

The stability of such perfluoroelastomers, while providing desirable performance characteristics in demanding environments, makes further processing difficult. While some techniques have been developed for laminating sheets of cured perfluoroelastomer to substrates such as metal, satisfactory techniques have heretofore not been available for bonding the cured perfluoroelastomer to itself. Such bonding techniques would be useful for preparing laminates of two perfluoroelastomers having somewhat different characteristics. More importantly, however, such a bonding technique would permit the preparation of O-rings from rod stock, rather than preparing a separate mold for each size of ring that might be desired.

SUMMARY OF THE INVENTION

The present invention provides a process for the bonding of cured perfluoroelastomers.

Specifically, the instant invention provides a process for bonding cured perfluoroelastomer to itself, the perfluoroelastomer being prepared from tetrafluoroethylene, perfluoroalkyl perfluoro(vinyl ether) and at least one cure site moiety, which process comprises (a) coating at least one surface to be joined with a thermoplastic perfluoropolymer bonding agent, (b) removing substantially all solvent from the bonding agent, (c) bringing the surfaces to be joined into contact under sufficient pressure to maintain the contact of the surfaces, (d) heating the surfaces to be joined to a temperature above the melting point of the perfluoropolymer and below the decomposition of the perfluoroelastomer, (e) cooling the surfaces to be joined to below the melting point of the perfluoropolymer, and (f) releasing the pressure from the surfaces to be joined.

Detailed Description of the Invention

Perfluoroelastomers which can be used in the present invention include those described in U.S. Pat. Nos. 3,682,872, 4,281,092, 4,487,903, 4,529,784, 4,948,853 and 4,983,697. Such perfluoroelastomers are prepared from tetrafluoroethylene, perfluoroalkyl perfluoro(vinyl ether) and at least one cure site moiety. For purposes of the present invention, minor portions of the tetrafluoroethylene can be replaced by other perhaloolefins, such as chlorotrifluoroethylene. Perfluoro(alkyl vinyl ethers) preferred for use in the present invention include perfluoro(methyl vinyl ether) (PMVE) and perfluoro(propyl vinyl ether) (PPVE).

Small concentrations of monomers which are not perfluorinated can also be used without significantly changing the desirable characteristics of these perfluoroelastomers. Normally, such monomers are incorporated as cure site moieties to obtain desirable cross-linking characteristics and may be present in concentrations up to about 3 mol %. Such monomers can include, for example, bromotetrafluorobutene, bromotrifluoroethylene, and monomers containing cyano groups. Alternatively or additionally, chain transfer agents which are not perfluorinated can be used in the polymerization reaction to introduce desirable fragments into the polymer for curing purposes, and are considered cure site moieties or monomers in the context of the present invention. Such agents include di-iodo compounds that result in bound iodine in the polymer, commonly at the end of the molecule.

The perfluoroelastomers to which the present invention relates are substantially fully cured, that is, less than about 1% of the cure sites are unreacted after the curing treatment or treatments used.

The perfluoroelastomer can be in the form of flat sheets to be bonded to each other or in the form of rod stock. Typically, the rod stock has a circular cross-sectional configuration, with a diameter of about from 0.070 to 0.500 inch. However, the present invention is similarly applicable to the joining of rod stock having other cross-sectional configurations, such as rectilinear, T- or V-shapes.

In accordance with the present process, at least one of the surfaces to be joined, and preferably both of the surfaces to be joined, are coated with a bonding agent which is a perfluorinated thermoplastic. A wide variety of perfluoropolymers can be so used, including those generally identified as PFA or FEP perfluoropolymers.

The perfluoropolymers which can be used as bonding agents include copolymers of monoethylenically unsaturated hydrocarbon monomers completely substituted with fluorine atoms or completely substituted with a combination of fluorine atoms and chlorine atoms. In this context, the term copolymer is used in its usual sense to mean that the polymer contains two or more different monomer units. Included are copolymers of tetrafluoroethylene with one or more of hexafluoropropylene, perfluoro (alkyl vinyl ethers) wherein the alkyl group has 1 to 5 carbon atoms, or vinylidene fluoride. Preferred copolymers are those prepared from tetrafluoroethylene, a perfluoroolefin and perfluoro(alkyl vinyl ether), and are designated PFA.

Copolymers of tetrafluoroethylene and hexafluoropropylene, designated as FEP fluoropolymers, are typically available as aqueous dispersions.

Still other perfluorinated thermoplastic bonding agents which can be used in the present process are uncured copolymers of the same general chemical composition as the cured perfluoroelastomer to be joined, that is, copolymers of tetrafluoroethylene, perfluoroalkyl perfluorovinylether and at least one cure site monomer.

The amount of the comonomer or comonomers present in the perfluoropolymers should be sufficient to provide a copolymer which is melt processable, but not so much that the copolymer loses significant structural or electrical properties. Loss of structural properties is related to the reduction of melting point and molecular weight which occurs upon addition of such comonomers, and will, or course, vary with the amount and identity of the comonomer. Those with longer chains will have a larger effect on the melting point than those with shorter chains. The mount of comonomer added should be low enough that the melting point of the copolymer is not reduced below about 240° C., and preferably not below about 260°-270° C. As illustration, copolymer of TFE and 12.3 wt % HFP has a melting point of about 260°-270° C.; a copolymer of TFE and 3.9 wt % perfluoro(propyl vinyl ether) (PPVE) has a melting point of about 308° C. When the comonomer is PPVE, therefore, it is preferable that the amount of PPVE be less than about 5%.

The bonding agent is conveniently applied to one or both surfaces of the cured perfluoroelastomer as a solution or dispersion, and especially an aqueous dispersion. Prior to bonding the coating surfaces, the dispersion is dried to substantially completely remove the water or other solvent or carrier. The dried layer of bonding agent will vary in thickness, depending on the particular polymer used. However, in general, a dried thickness of less than about 1/1000 of an inch or 0.00002 microns will be present. In the alternative, the bonding agent can be applied as a preformed film without a dispersant or solvent. The bonding agent is typically used at a minimum thickness, since thicker layers can depreciate the tensile properties of the finished article.

The surfaces to be joined, after application of the bonding agent, are brought into contact under sufficient pressure to assure an intimate contact of the surfaces throughout the heating cycle. For rod stock, this pressure can be applied by a retaining means such as a collar, having internal dimensions designed to apply pressure to the joint and maintain the surfaces in intimate contact, taking into account the expansion of the perfluoroelastomer which generally occurs on heating.

The surfaces to be joined are then heated to a temperature above the melting point of the perfluoropolymer bonding agent and below the decomposition temperature of the perfluoroelastomer. A wide variety of heating means can be used, such as an oven of appropriate size or a concentrated heat source such as an induction heater.

The bonding temperature will necessarily vary with the particular bonding agent used. For the preferred FEP perfluoropolymers, temperatures of about from 550°-650° F. have been found to be satisfactory. Once the bonding agent is brought to the required temperature, the period of further heating is not critical.

After heating, the pressure on the surfaces to be joined is maintained to assure intimate contact of the surfaces throughout the cooling to below the melting point of the perfluoropolymer bonding agent. The pressure can then be removed. The bonded perfluoroelastomer compositions can be cooled at ambient temperatures or, if faster cooling is desired, the fused elastomer, with its retaining means, can be immersed in water.

The process of the present invention results in fused perfluoroelastomers which, for example, as finished O-rings exhibit tensile properties which are substantially equivalent to compression molded parts at temperatures of up to about 200° C., including tensile strength, tensile modulus at 50 and 100% elongation, elongation at break and 100% elongation. Moreover, such fused perfluoroelastomer parts exhibit excellent retention of properties after extended immersion to a variety of chemicals, including nitric acid, methylene diamine and many hydrocarbon oils, ethylene oxide and liquid chloro-fluoro carbons.

The outstanding performance of the fused perfluoroelastomers is particularly surprising in view of the known characteristics of the materials used in the process. In melt adhesion applications, a minimum degree of miscibility of the surfaces to be bonded and the melt adhesive is generally considered to be necessary. By contrast, the cured perfluoroelastomers to which the present process relates and the perfluoropolymers used as bonding agents are known to be immiscible.

The present invention is further illustrated by the following specific examples, in which parts and percentages are by weight unless otherwise indicated.

EXAMPLES 1-2 AND COMPARATIVE EXAMPLES A-F

In Examples 1 and 2, a cured perfluoroelastomer was prepared from tetrafluoroethylene, perfluoromethylvinylether and 8-cyanovinylether in a monomer ratio of 54/44/2, and cured and post-cured according to conventional procedures, as described in Aufdermarsh et al., U.S. Pat. No. 4,394,489. The resulting rod had an outer diameter of 0.210±0.005 inch. This material was butt spliced by first coating each end of the material to be spliced with an aqueous dispersion of fluorinated ethylene propylene copolymer having about 55% solids and containing 5% "Triton" dispersant. The coated ends of the rods were dried and placed in intimate contact within a steel block retaining means. The splice was heated with a high-frequency induction heater operated for three minutes at a 600° F. splice cycle and then allowed to cool to room temperature before removing the splice from the retaining means.

In Comparative Examples A-C, the above procedure was repeated, except that the perfluoroelastomer was spliced before curing.

In Comparative Examples D-F, the rings tested were not spliced, but were compression molded in their final configuration.

The tensile properties of the resulting rings were tested for standard tensile properties, including tensile Modulus at 50% elongation (M-50), tensile Modulus at 100% elongation (M-100), tensile Modulus at break (TB), and elongation at break (EB). The tensile strength was evaluated and found to be substantially equivalent to that of the compression molded sample. The results are summarized in Table I.

EXAMPLES 3-5 AND COMPARATIVE EXAMPLES G-L

The above procedure was repeated, except that the rod had an outer diameter of 0.129±0.004 inch, and heat source used was an oven in which the splice was heated for one hour at 600° F. The samples were tested as before and the performance characteristics are summarized in Table II.

EXAMPLE 6

If the general procédure of Example 1 is repeated, using a PFA bonding agent, similar results will be obtained.

EXAMPLE 7

If the general procedure of Example 1 is repeated, using an uncured terpolymer of TFE, PMVE and 8-CNVE bonding agent instead of the FEP perfluoropolymer, similar results will be obtained.

TABLE I

| EXAMPLE | M-50 | M-100 | TB | EB |
|---|---|---|---|---|
| 1 | 710 | 1092 | 1461 | 113* |
| 2 | 1057 | 1293 | 2698 | 148# |
| AVERAGE | 883 | 1193 | 2079 | 131 |
| A | 354 | 1107 | 1408 | 118* |
| B | 345 | — | 1048 | 99* |
| C | 326 | 986 | 1406 | 118* |
| AVERAGE | 342 | 1046 | 1287 | 112 |
| D | 743 | 1085 | 2200 | 136# |
| E | 766 | 1045 | 2091 | 136* |
| F | 736 | 1060 | 1516 | 118* |
| AVERAGE | 748 | 1063 | 1936 | 130 |

TABLE II

| EXAMPLE | M-50 | M-100 | TB | EB |
|---|---|---|---|---|
| 3 | 632 | 884 | 1826 | 145* |
| 4 | 641 | 865 | 1820 | 146* |
| 5 | 609 | 881 | 2499 | 163* |
| AVERAGE | 627 | 877 | 2048 | 151 |
| G | 313 | 1067 | 1548 | 116* |
| H | 289 | 1078 | 1554 | 117* |
| I | 314 | 1074 | 1910 | 126* |
| AVERAGE | 305 | 1073 | 1671 | 120 |
| J | 635 | 886 | 2659 | 158# |
| K | 713 | 1052 | 1941 | 138# |
| L | 669 | 1003 | 1706 | 150# |
| AVERAGE | 672 | 991 | 2102 | 148 |

*Break occurred at butt joint.
Break did not occur at butt joint.

We claim:

1. A process for bonding cured perfluoroelastomer to itself, the perfluoroelastomer being prepared from tetrafluoroethylene, perfluoroalkyl perfluoro (vinyl ether) and at least one cure site moiety which process comprises
   (a) coating at least one surface to be joined with a thermoplastic perfluoropolymer bonding agent in a solvent or carrier,
   (b) removing substantially all solvent or carrier from the bonding agent,
   (c) bringing the surfaces to be joined into contact under sufficient pressure to maintain the contact of the surfaces,
   (d) heating the surfaces to joined to a temperature above the melting point of the perfluoropolymer and below the decompositions of the perfluoroelastomer,
   (e) cooling the surfaces to be joined to below the melting point of the perfluoropolymer,
   (f) releasing the pressure from the surfaces to be joined.

2. A process of claim 1 wherein the perfluoropolymer is a applied in the form of an aqueous dispersion.

3. A process of claim 1 wherein the perfluoropolymer bonding agent consists essentially of a copolymer tetrafluoroethylene and hexafluoropropylene.

4. A process of claim 3 wherein the surfaces to be joined are heated to a temperature of about from 550°–650° F.

5. A process of claim 1 wherein the perfluoropolymer bonding agent consists essentially of a copolymer of tetrafluoroethylene, perfluoro-olefin and perfluoro(alkyl vinyl ether).

6. A process of claim 1 wherein the cured perfluoroelastomer is rod stock having a diameter of about from 0.07 to 0.5 inch.

7. A bonded perfluoroelastomer article resulting from the process of claim 1.

* * * * *